(12) United States Patent
Setchell

(10) Patent No.: US 6,836,345 B1
(45) Date of Patent: Dec. 28, 2004

(54) METHOD FOR INCLUDING TRADITIONAL PHOTOGRAPHIC CALIBRATION INTO DIGITAL COLOR MANAGEMENT

(75) Inventor: John S. Setchell, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/538,421

(22) Filed: Mar. 29, 2000

(51) Int. Cl.[7] .............................. H04N 1/50; H04N 1/60
(52) U.S. Cl. ........................ 358/1.9; 358/504; 358/518
(58) Field of Search ................................ 358/504, 296, 358/527, 1.9, 518, 519, 506; 382/162, 167; 345/593

(56) References Cited

U.S. PATENT DOCUMENTS

| | | | |
|---|---|---|---|
| 4,941,039 A | | 7/1990 | D'Errico ...................... 358/518 |
| 4,992,861 A | | 2/1991 | D'Errico ...................... 358/500 |
| 5,267,030 A | * | 11/1993 | Giorgianni et al. ......... 358/527 |
| 5,430,525 A | * | 7/1995 | Ohta et al. .................. 399/366 |
| 5,481,380 A | | 1/1996 | Bestmann ................... 358/504 |
| 5,521,723 A | | 5/1996 | Madden et al. ............. 358/518 |
| 5,680,333 A | * | 10/1997 | Jansson .......................... 703/6 |
| 5,786,823 A | * | 7/1998 | Madden et al. ............. 345/591 |
| 5,828,461 A | * | 10/1998 | Kubo et al. ................. 358/296 |
| 5,956,044 A | * | 9/1999 | Giorgianni et al. ......... 345/590 |
| 6,178,007 B1 | * | 1/2001 | Harrington ................... 358/1.9 |
| 6,307,961 B1 | * | 10/2001 | Balonon-Rosen et al. .. 382/167 |
| 6,501,850 B2 | * | 12/2002 | Setchell, Jr. ................ 382/162 |
| 6,594,388 B1 | * | 7/2003 | Gindele et al. ............. 382/167 |
| 6,603,483 B1 | * | 8/2003 | Newman ..................... 345/593 |
| 2002/0122589 A1 | * | 9/2002 | Reiman et al. ............. 382/167 |

OTHER PUBLICATIONS

U.S. patent application Ser. No. 09/451,303, Reiman, filed Nov. 29, 1999.

* cited by examiner

*Primary Examiner*—Scott Rogers
(74) *Attorney, Agent, or Firm*—David M. Woods

(57) ABSTRACT

A method for incorporating photographic calibration into digital color management having an abstract color transformation profile includes the steps of: (a) generating an optical reproduction from a photographic film containing an image of a target having a plurality of colored and neutral patches; (b) scanning said film in a transmission scanner and generating film image data; (c) transforming the film image data to data in a first profile connection space using the color management system; (d) reading said optical reproduction and generating reproduction image data; (e) transforming the reproduction image data to data in a second profile connection space using a color management system; and (f) computing an abstract profile to transform said data in the first profile connection space to data in the second profile connection space.

47 Claims, 4 Drawing Sheets

METHOD FOR INCLUDING TRADITIONAL PHOTOGRAPHIC CALIBRATION INTO DIGITAL COLOR MANAGEMENT

FIELD OF THE INVENTION

The invention relates generally to the field of digital color management and, more specifically, to creating an abstract profile that digitally reproduces the color of an optically created image on a digitally created image.

BACKGROUND OF THE INVENTION

In traditional photography, photo processing labs have a printing apparatus that optically creates prints. Typically, film containing negative images is passed under a light source so that the light passes through the film and onto a light-sensitive paper, creating a latent image which is then developed by a chemical process. Colored filters interposed between the light source and the paper provide means for adjusting the color balance of the prints.

In contrast, in creating prints digitally, color transforms are used to adjust the colors. A digital printing system typically uses scanners, displays, and printers which have different relationships between their digital values and the corresponding image colors. Color transforms are used to modify the relationship between these digital values and colors to produce accurate, predictable, and aesthetically pleasing prints. These transforms are typically embodied in profiles of a color management system.

While presently known and utilized color management systems often provide significant improvement in color reproduction in digital imaging systems, they have certain shortcomings, particularly with respect to reproduction of images from photographic negatives. They do not provide convenient and reliable means for duplicating the appearance of an optical print. The optical and digital systems function independently so that adjustments made in the optical system are not used in the digital system and vice versa. It is desirable to have the adjustments made optically to be included in the digital process for efficiency in the process of generating images. This would eliminate duplicating the adjustment digitally for which an adjustment has already been created optically.

The prior art of digital color management is primarily concerned with the reproduction at the output of a system of colors of some original version of an image provided to the input stage of the system. While many methods have been disclosed, for example, as in U.S. Pat. No. 5,481,380, none of these methods has addressed the problem of systematically adjusting an image to match an arbitrary aim. This problem is most obvious in the case of producing a viewable image from a photographic negative. A negative is fundamentally a record of exposures of the elements of a scene. It is not designed for direct viewing; the colors are reversed, and there is often an overall orange cast resulting from certain chemically-generated optical features of the photographic system. In short, the negative must first be rendered in some fashion to produce an image suitable for viewing. This is traditionally done by a process in which light is passed through the negative onto paper coated with photosensitive material which, upon chemical development, reverse the colors of the negative and produce a positive image. The present invention teaches a simple method for introducing the result of such an optical process, or indeed of any image forming process, into a digital imaging system as the aim for reproduction of color and tone.

Commonly assigned copending U.S. patent application Ser. No. 09/100,217, which was filed Jun. 19, 1998 and entitled "Method for Including Traditional Photographic Calibration into Digital Color Management", addressed some of these issues; however, it was concerned only with color balance changes represented as changes in density of neutrals of a photographic print material. To overcome this limitation, a method is needed for adjusting colors irrespective of the particular medium in which they are expressed or of the devices used for scanning and printing the images.

SUMMARY OF THE INVENTION

The present invention is directed to overcoming one or more of the problems set forth above. Briefly summarized, according to one aspect of the present invention, a method for incorporating photographic calibration into digital color management having an abstract color transformation profile includes the steps of: (a) generating an optical reproduction from a photographic film containing an image of a target having a plurality of colored and neutral patches; (b) scanning said film in a transmission scanner and generating film image data; (c) transforming the film image data to data in a first profile connection space using the color management system; (d) reading said optical reproduction and generating reproduction image data; (e) transforming the reproduction image data to data in a second profile connection space using a color management system; and (f) computing an abstract profile to transform said data in the first profile connection space to data in the second profile connection space.

In a preferred embodiment, the optical reproduction generated in step (a) is an optical print and the reading of said optical reproduction in step (d) comprises scanning the optical print on a reflection scanner.

The advantage of the invention is that it addresses the problem of systematically adjusting an image to match an arbitrary aim, particularly where that aim is to produce a viewable image from a photographic film, such as a negative. The invention thus provides a convenient and reliable means for duplicating the appearance of an optical print. These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because image processing systems employing color management are well known, the present description will be directed in particular to attributes forming part of, or cooperating more directly with, the present invention. Any attribute or element not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method and system as described according to the invention in the following materials, software not specifically shown, described or suggested herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
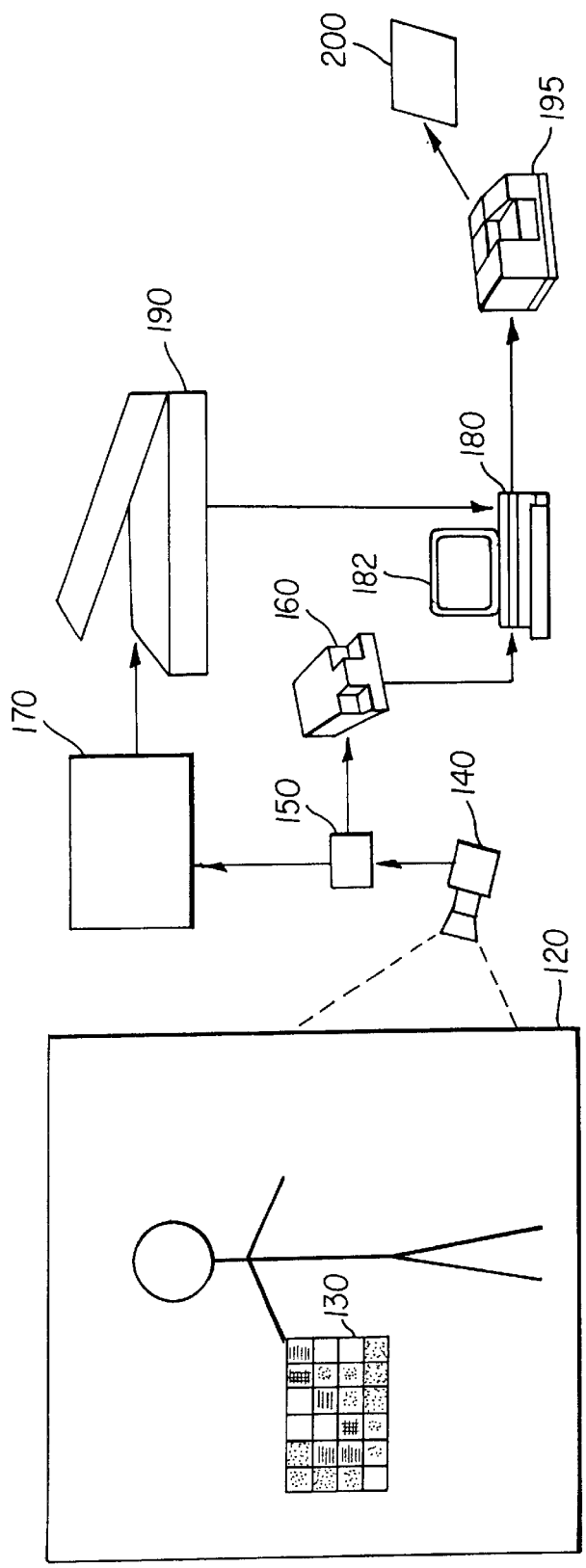
FIG. 1 is an overall diagram of the process used to create and use an abstract profile according to the present invention.

Referring to FIG. 1, an image of a scene 120 containing a target 130 is captured by a conventional camera 140 on a film 150. The film 150 is chemically processed by conventional means (not shown) and optically printed to produce a print 170. The film 150 is scanned by a transmission scanner 160 and the resulting digital image is input to a computer 180. The print is scanned by a reflection scanner 190 and the resulting digital image is also input to the computer 180. The object of this process is to manage the reproduction of the color of an image optically created by the transmission scanner 160 so that it duplicates the appearance of the optical print 170 when printed out by a printer 195 as a print 200.

Figure 4:
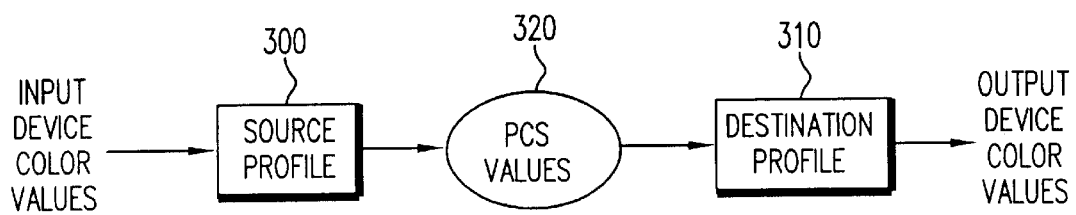
FIG. 4 is a diagram illustrating the use of source and destination profiles in a color management module to process image device color values.
Figure 5:
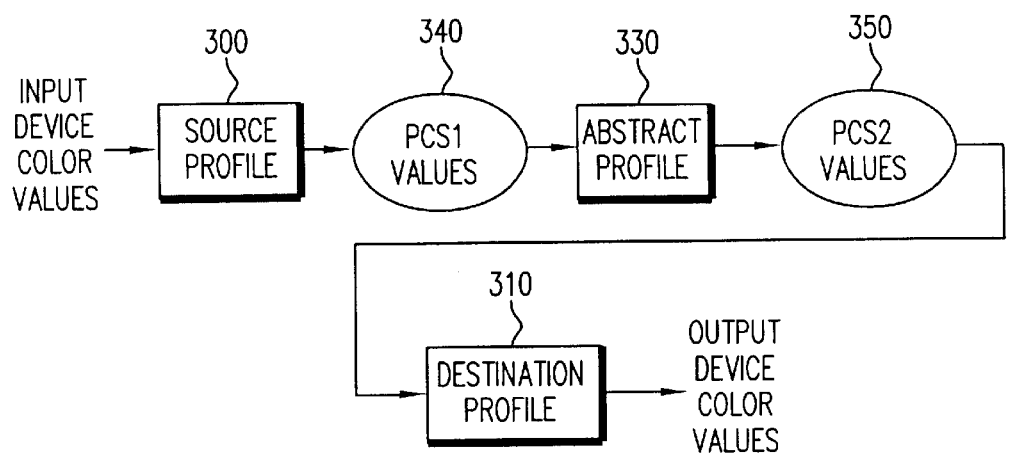
FIG. 5 is a diagram illustrating the use of source, abstract and destination profiles in a color management module to process image device color values and to modify the color data.

The use of special techniques to manage the reproduction of color in systems like that shown in FIG. 1 is well known and described in the literature, for example, see E. J. Giorgianni and T. E. Madden, *Digital Color Management*, Addison-Wesley: Reading, Mass., 1998. Briefly stated, such a color management system uses profiles to encapsulate the color reproduction characteristics of imaging devices like scanners, displays, and printers. A typical configuration comprises a source profile 300 and a destination profile 310 connected through a profile connection space (PCS) 320 as shown in FIG. 4. The architecture also allows for another type of profile, called an abstract profile 330, to be inserted between the source and destination profiles 300 and 310, as shown in FIG. 5. Giorgianni and Madden give an example (p. 425) of the use of an abstract profile to produce an overall color balance adjustment to an image. Because the abstract profile 330 is inserted between the source and destination profiles 300 and 310, the input color values are processed through the source profile 300 to form PCS1 values in a first profile connection space (PCS1) 340, and the resulting values are processed through the abstract profile 330 to form PCS2 values in a second profile connection space (PCS2) 350. The PCS2 values are then processed through the destination profile 310 to form output device color values. A generalization of the concept of abstract profile is a feature of the present invention and will be described in further detail in the following paragraphs.

Figure 2:
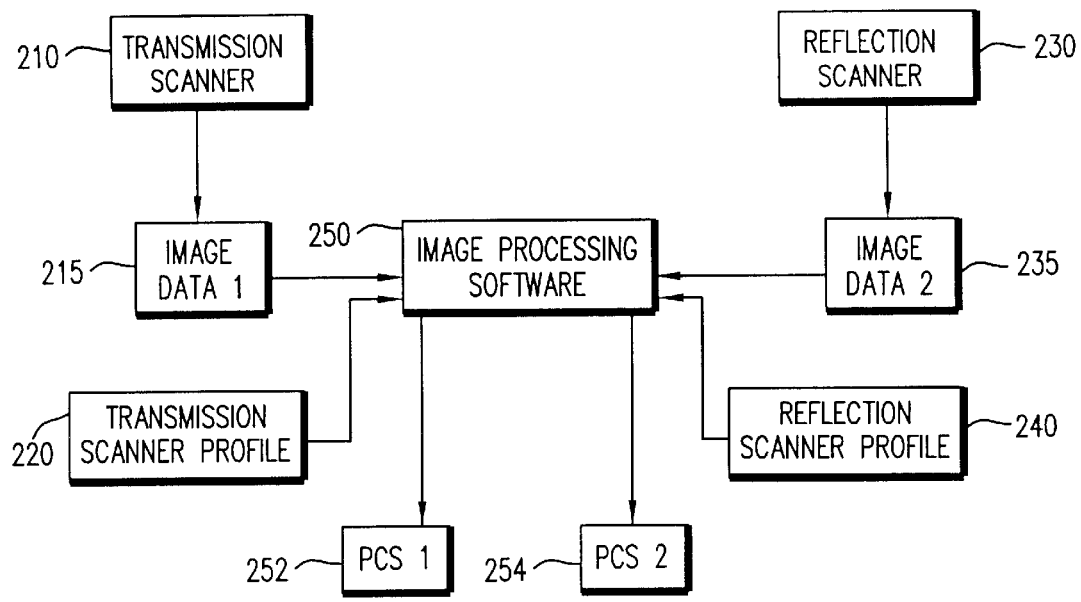
FIG. 2 is a diagram showing the generation of first profile connection space (PCS1) data from a transmission scanner and second profile connection space (PCS2) data from a reflection scanner.

Referring now to FIG. 2, image processing software 250 such as Adobe Photoshop™ is used within the computer 180 (FIG. 1) to process image data 215 from a transmission scanner 210 to a first profile connection space (PCS1) 252, employing a transmission scanner profile 220 created by commonly available profile building software such as Kodak ColorFlow Profile Editor, used in accordance with the operating instructions supplied with the software. In similar fashion, the image processing software is used to process image data 235 from a reflection scanner 230 to a second profile connection space (PCS2) 254, employing a reflection scanner profile 240, also created by commonly available profile building software such as Kodak ColorFlow Profile Editor.

Figure 3:
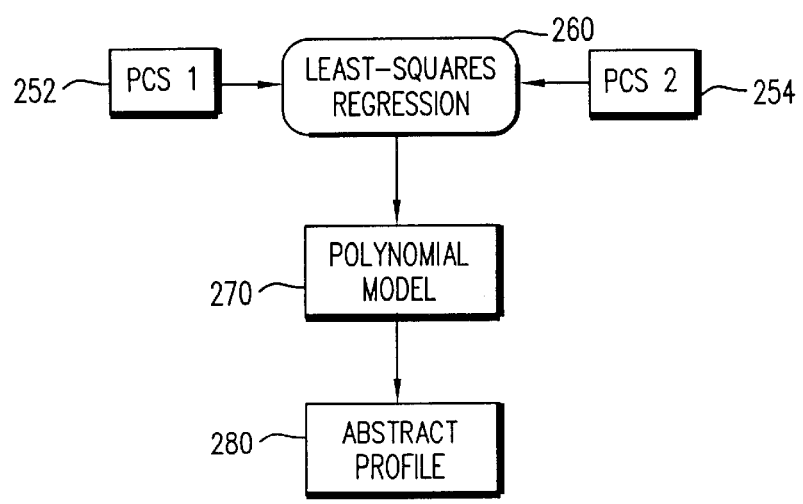
FIG. 3 is a diagram showing the use of the PCS1 data and the PCS2 data generated in FIG. 2 to create a polynomial model and an abstract profile.

Referring to FIG. 3, the values in profile connection spaces PCS1 and PCS2 are compared, for example by a least-squares regression algorithm 260, to create a polynomial model 270, which is subsequently used to create an abstract profile 280. The abstract profile 280 is then used in combination with the transmission scanner profile 220 and an appropriate printer profile (not shown, but commonly available for the printer in use) to modify the image data so that a print 200 made by the printer 195 will match the optical print 170 (FIG. 1). Moreover, the abstract profile 280 and the transmission profile 220 may be combined into a single profile containing the properties of both; this can be useful in image processing applications in use today that are limited to the use of just two profiles at a time—one for the source and the other for the destination.

An example of a construction of the polynomial model 270 is as follows. Assume that the target portion 130 of the image 120 comprises 24 patches. Then each patch i=1,2,3, . . . ,24 will have three PCS coordinates in each profile connection space. Let these coordinates be X(i,1), X(i,2), X(i,3) for the PCS1 data and Y(i,1), Y(i,2), Y(i,3) for the PCS2 data. The polynomial model will have the form $Y(i,1)=c(1,1) \times X(i,1)+c(1,2) \times X(i,2)+c(1,3) \times X(i,3)+c(1,4) \times X(i,1)^2+c(1,5) \times X(i,2)^2+c(1,6) \times X(i,3)^2+\ldots$ $Y(i,2)=c(2,1) \times X(i,1)+c(2,2) \times X(i,2)+c(2,3) \times X(i,3)+c(2,4) \times X(i,1)^2+c(2,5) \times X(i,2)^2+c(2,6) \times X(i,3)^2+\ldots$ $Y(i,3)=c(3,1) \times X(i,1)+c(3,2) \times X(i,2)+c(3,3) \times X(i,3)+c(3,4) \times X(i,1)^2+c(3,5) \times X(i,2)^2+c(3,6) \times X(i,3)^2+\ldots$ Least-squares regression 260 is a well-known technique for finding values of c(i,j) that will minimize the difference between the given values of Y(i,j) and the values of Y(i,j) computed from the equations.

Constructing a polynomial model is not the only way to relate PCS1 to PCS2. An example of another technique is given in U.S. Pat. Nos. 4,941,039, "Color Image Reproduction Apparatus Having a Least Squares Lookup Table Augmented by Smoothing" and 4,992,861, "Color Image Reproduction Apparatus Having a Digitally Operated Lookup Table Constructed by Means of a Least Squares Algorithm", both of which are incorporated herein by reference. The techniques described in these patents are useful for constructing a multidimensional lookup table directly from the data with what is in effect a piecewise linear model.

Figure 6:
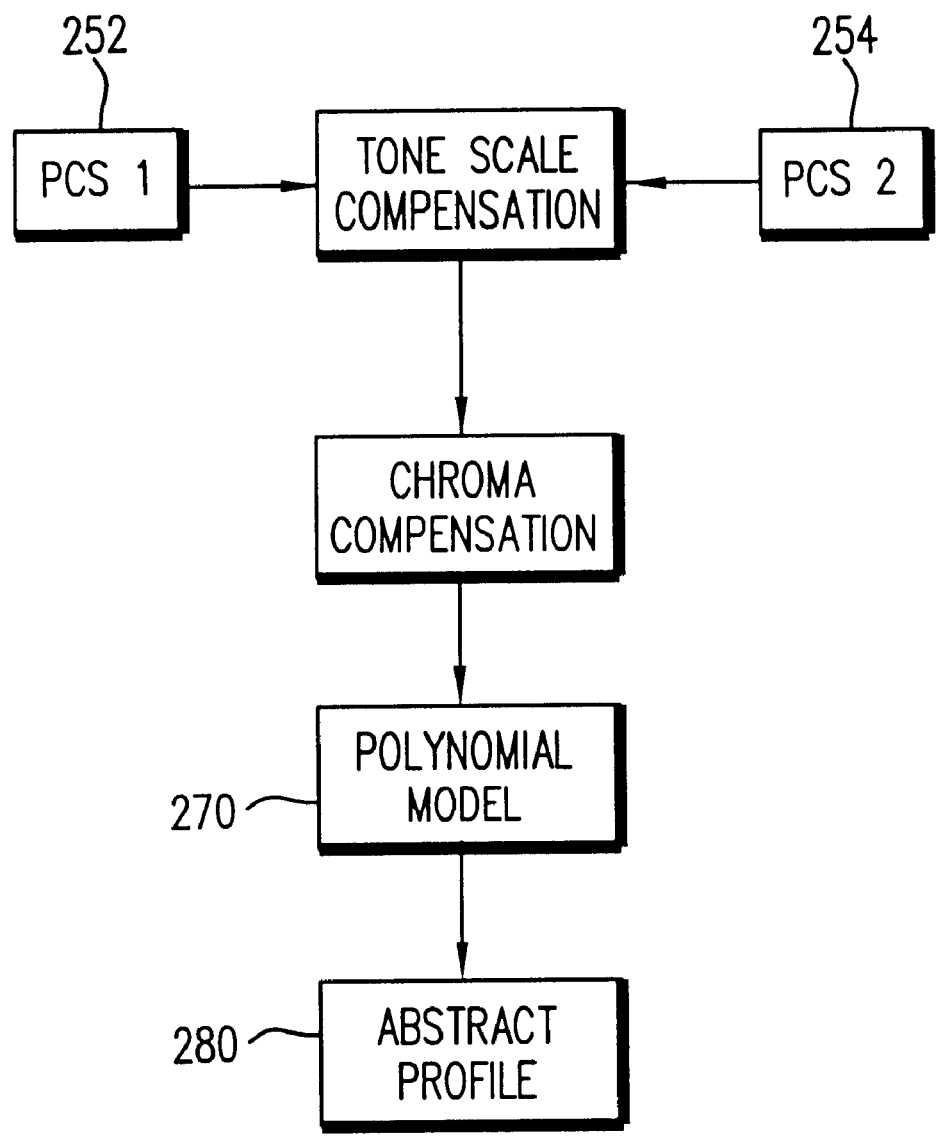
FIG. 6 is a diagram showing the treatment of tone scale and other color differences separately before creating a polynomial model and an abstract profile as shown in FIG. 3.

Considering the differences between the profile connection spaces PCS1 and PCS2, it is often beneficial to treat tone scale and other color differences separately before constructing a model, as illustrated in FIG. 6. This often improves the accuracy of the resulting transform. Such treatments are based upon conventional techniques known to those of ordinary skill in this art. For example, profiles conforming to the International Color Consortium (ICC) specification can use CIELAB color space as a color profile connection space, where in this space the L* coordinate represents lightness and the C* coordinate represents chroma. The lightness values of the profile connection space PCS2 are mapped to the profile connection space PCS1 with a high degree of accuracy by a one-dimensional look-up table (LUT) operating on the L* channel of this color space. Such a LUT is easily constructed by one skilled in the art, using simple interpolation techniques. The other color differences (hue and chroma) often have a systematic component, for example the chroma of a typical portrait print is less than that of a typical consumer print. This systematic difference is mapped by a simple factor applied to the C* data. Once these adjustments have been made, the model has smaller differences left to deal with, and hence fits the data with smaller residual errors.

This approach is not limited to luminance-chrominance data such as CIELAB, although the implementation is somewhat different in other color spaces. In RGB-type color spaces such as XYZ, for example, the tone scale correction LUT is still constructed with simple interpolation techniques, but it must operate on all three channels of the data. The hue and chroma differences in this color space are not so easily compensated, but improvements in the model fit are still achievable by first applying scaling factors to the X and Z channels separately.

It will be understood by a person skilled in the art that reflection scanner profiles created with software such as Kodak ColorFlow Profile Editor typically represent the colors of the reflection print to a high degree of accuracy in a profile connection space. Profiles created for a transmission scanner scanning color negative material, however, are generally not accurate for several reasons. Among these reasons is the need to accommodate a variety of illumination and exposure conditions; this is not directly addressed in the present invention instead it is assumed that a suitable scene balance algorithm or operator adjustment has already been employed to adjust the image data to standard conditions. In a typical professional photographic lab, such an operator adjustment is often facilitated by the use of apparatus like the Kodak Professional Video Analyzing Computer (PVAC). A skilled PVAC operator manipulates the machine's controls to adjust a calibrated electronic display to a brightness and color balance judged correct for a specific image. The control readings are subsequently used to adjust filters or exposure times for printing the image on an optical printer or to make adjustments to a digital scanner during the scanning process. Another reason why a transmission scanner is generally not accurate in these circumstances is the lack of standard color negative targets. Even if such targets were available, the means for characterizing transmissions scanners would be incomplete without well-defined aims for printing such targets. The present invention provides a means for individual labs to readily provide such aims by making an optical print of a negative of a scene according to the labs' usual criteria for density and color balance, for example based on pleasing rendition of human skin color. It is only necessary to include in the scene an appropriate target.

Although not the subject of the present invention, construction and use of targets is discussed in greater detail in commonly assigned, copending U.S. patent application Ser. No. 09/451,303, filed Nov. 29, 1999, entitled "Constructing Profiles to Compensate for Non-Linearities in Image Capture", which is incorporated herein by reference. It should be understood that the changes needed to transform a profile connection space from a negative scan to a profile connection space from a reflection scan are typically not severe, and therefore a simpler target than prescribed by that application will generally suffice. Good results have been obtained for many cases with the use of the 24 patch Macbeth Color Checker®.

A person skilled in the art will understand that the implementation of this invention is not limited to the specific hardware configuration described in FIG. 1. For example, the reflection scanner 190 may be replaced by a spectrophotometer or a colorimeter well known in the art. In this case, the processing performed by the image processing software 250 and the reflection scanner profile 240 is replaced by the appropriate mathematical algorithm to transform the measured colors of the target to the encoding of the profile connection space. When the color management system being used conforms to the profile format specification promulgated by the International Color Consortium (ICC), that specification provides the basic reference for the algorithm. The ICC specification may be obtained from the International Color Consortium, NPES, 1899 Preston White Drive, Reston, Va.

Furthermore, it is not necessary to actually make the optical print 170 of the negative 150. The principles of tone reproduction involved in printing a negative to a reflection print are described in the literature: for example, in Chapter 11 of Photographic Materials and Processes by L. Stroebel, J. Compton, I. Current, and R. Zakia, and more specifically in U.S. Pat. No. 5,521,723, which is incorporated herein by reference. Using these principles, a person skilled in the art can compute from the densities of the target patches 130 on the negative 150 what the densities of the corresponding patches on a print should be. The colors of the patches and hence their PCS values are then computed from the spectral reflectance curves of the image-forming dyes used in the print, at the amounts determined by the densities.

A person skilled in the art will recognize that the method described is easily extended to cases beyond that of digitally processing a negative to a reflection print. For example, the method has been used to make excellent transparencies ("slides") from color negatives. In this case, it is convenient to use transparency film to photograph the scene containing the target under the same conditions as were used with the negative film. After conventional processing, the slide is used instead of the optical print 170 to provide the aims for the reproduction, either by scanning it in a transmission scanner and transforming it as before with a profile built with conventional software, or by measuring the colors of the target patches with a spectrophotometer or colorimeter. In another variation on the method, the aims are determined by first displaying the image from the scanned negative 150 on a calibrated computer monitor ("soft copy display") 182 (FIG. 1) and then modifying the color balance, contrast, etc., using image processing software such as Adobe Photoshop. When the appearance of the image is judged satisfactory, the image is processed through a profile for the monitor to produce PCS values.

In yet another example of the utility of this method, the object is to produce high-quality reflection prints from slides. The same scene containing a target is again photographed with both color negative and transparency film, and an optical print 170 is then produced or synthesized from the negative as before. In this case, however, the slide is scanned as the basis for the ultimate digital print. All the steps are otherwise equivalent to those already described.

One more example of the application of the method involves the use of a digital camera rather than a slide as the starting point for the digital print which emulates the color and tonescale of the optical print as before. In this case, the digital camera output replaces the output of the transmission scanner 160, while the conventional camera 140, the negative film 150, the optical print 170 and the reflection scanner 190 are used as before.

The invention has been described with reference to a preferred embodiment. However, it will be appreciated that variations and modifications can be effected by a person of ordinary skill in the art without departing from the scope of the invention.

Parts List 120 scene containing a target
130 target having a plurality of colored and neutral patches
140 conventional camera containing light-sensitive film
150 light-sensitive film
160 transmission scanner
170 optical print
180 digital computer
182 computer display
190 reflection scanner
195 digital printer
200 digital print
210 transmission scanner
215 image data 1
220 transmission scanner profile
230 reflection scanner
235 image data 2
240 reflection scanner profile
250 image processing software
252 PCS1
254 PCS2
260 least-squares regression
270 polynomial model
280 abstract profile
300 source profile
310 destination profile
320 PCS values
330 abstract profile
340 PCS1values
350 PCS2 values

What is claimed is:

1. A method for incorporating photographic calibration into a digital color management system having an abstract color transformation profile, said method comprising the steps of:
   (a) generating an optical reproduction from a photographic film containing an image of a target having a plurality of colored and neutral patches;
   (b) scanning said photographic film in a transmission scanner and generating film image data;
   (c) transforming the film image data to data in a first profile connection space using the color management system;
   (d) reading said optical reproduction and generating reproduction image data;
   (e) transforming the reproduction image data to data in a second profile connection space using the color management system; and
   (f) computing an abstract profile to transform said data in the first profile connection space to data in the second profile connection space;
   wherein the transmission scanner included in step (b) includes a transmission scanner profile and the method further comprises the step of combining the abstract profile with the transmission scanner profile.

2. The method as claimed in claim 1 wherein the optical reproduction generated in step (a) is an optical print.

3. The method as claimed in claim 2 wherein the reading of said optical reproduction in step (d) comprises scanning said optical print on a reflection scanner.

4. The method as claimed in claim 1 wherein the optical reproduction generated in step (a) is a photographic transparency.

5. The method as claimed in claim 4 wherein the reading of said optical reproduction in step (d) comprises scanning said photographic transparency on a transmission scanner.

6. The method as claimed in claim 1 wherein the reading of said optical reproduction in step (d) comprises measuring the colors of the target patches on the optical reproduction with a spectrophotometer.

7. The method as claimed in claim 1 wherein the reading of said optical reproduction in step (d) comprises measuring the colors of the target patches on the optical reproduction with a colorimeter.

8. The method as claimed in claim 1, wherein the computation of an abstract profile in step (f) is accomplished using a polynomial model technique.

9. The method as claimed in claim 1 further comprising the step of storing the abstract profile.

10. The method as claimed in claim 1 wherein the optical reproduction generated in step (a) is generated from a photographic negative.

11. The method as claimed in claim 1 wherein the optical reproduction generated in step (a) is generated from a photographic slide.

12. A method for incorporating photographic calibration into a digital color management system having an abstract color transformation profile, said method comprising the steps of:
   (a) generating an optical reproduction from a photographic film containing an image of a target having a plurality of colored and neutral patches;
   (b) scanning said photographic film in a transmission scanner and generating film image data;
   (c) transforming the film image data to data in a first profile connection space using the color management system;
   (d) reading said optical reproduction and generating reproduction image data;
   (e) transforming the reproduction image data to data in a second profile connection space using the color management system; and
   (f) computing an abstract profile to transform said data in the first profile connection space to data in the second profile connection space;
   wherein the step (f) of computing an abstract profile includes the correction of tone scale and other color differences before computing the abstract profile.

13. The method as claimed in claim 12 wherein the optical reproduction generated in step (a) is an optical print.

14. The method as claimed in claim 13 wherein the reading of said optical reproduction in step (d) comprises scanning said optical print on a reflection scanner.

15. The method as claimed in claim 12 wherein the optical reproduction generated in step (a) is a photographic transparency.

16. The method as claimed in claim 15 wherein the reading of said optical reproduction in step (d) comprises scanning said photographic transparency on a transmission scanner.

17. The method as claimed in claim 12 wherein the reading of said optical reproduction in step (d) comprises measuring the colors of the target patches on the optical reproduction with a spectrophotometer.

18. The method as claimed in claim 12 wherein the reading of said optical reproduction in step (d) comprises measuring the colors of the target patches on the optical reproduction with a calorimeter.

19. The method as claimed in claim 12 wherein the computation of an abstract profile in step (f) is accomplished using a polynomial model technique.

20. The method as claimed in claim 12 further comprising the step of storing the abstract profile.

21. A method for incorporating photographic calibration into a digital color management system having an abstract color transformation profile, said method comprising the steps of:
   (a) generating optical reproduction data from a photographic negative containing an image of a target having a plurality of colored and neutral patches;
   (b) scanning said negative in a transmission scanner and generating negative image data;
   (c) transforming the negative image data to data in a first profile connection space using the color management system;
   (d) transforming the optical reproduction data to data in a second profile connection space using the color management system; and
   (e) computing an abstract profile to transform said data in the first profile connection space to data in the second profile connection space;
   wherein the transmission scanner included in step (b) includes a transmission scanner profile and the method further comprises the step of combining the abstract profile with the transmission scanner profile.

22. The method as claimed in claim 21 wherein generating optical reproduction data in step (a) comprises displaying the image of the target on a calibrated computer monitor and modifying the image on the monitor until modified image data is obtained corresponding to a satisfactory appearance of the image and step (d) comprises transforming the modified image data to data in a second profile connection space using the color management system.

23. A method for incorporating photographic calibration into a digital color management system having an abstract color transformation profile, said method comprising the steps of:
   (a) generating optical reproduction data from a photographic negative containing an image of a target having a plurality of colored and neutral patches;
   (b) scanning said negative in a transmission scanner and generating negative image data;
   (c) transforming the negative image data to data in a first profile connection space using the color management system;
   (d) transforming the optical reproduction data to data in a second profile connection space using the color management system; and
   (e) computing an abstract profile to transform said data in the first profile connection space to data in the second profile connection space;
   wherein generating optical reproduction data in step (a) comprises computing print densities from transmission densities of the target patches from the photographic negative and step (d) comprises transforming the print densities to data in a second profile connection space using the color management system.

24. A method for incorporating photographic calibration into a digital color management system having an abstract color transformation profile, said method comprising the steps of:
   (a) generating an optical reproduction from a photographic negative containing an image of a target having a plurality of colored and neutral patches;
   (b) capturing an image of the target with a digital camera and generating camera image data;
   (c) transforming the camera image data to data in a first profile connection space using the color management system;
   (d) reading said optical reproduction and generating reproduction image data;
   (e) transforming the reproduction image data to data in a second profile connection space using the color management system; and
   (f) computing an abstract profile to transform said data in the first profile connection space to data in the second profile connection space;
   wherein the step (f) of computing an abstract profile includes the correction of tone scale and other color differences before computing the abstract profile.

25. A method for incorporating photographic calibration into a digital color management system having an abstract color transformation profile, said method comprising the steps of:
   (a) capturing an image of a target having a plurality of colored and neutral patches on both a photographic negative and a photographic transparency;
   (b) generating an optical reproduction from the photographic negative;
   (c) scanning said photographic transparency in a transmission scanner and generating transparency image data;
   (d) transforming the transparency image data to data in a first profile connection space using the color management system;
   (e) reading said optical reproduction and generating reproduction image data;
   (f) transforming the reproduction image data to data in a second profile connection space using the color management system; and
   (g) computing an abstract profile to transform said data in the first profile connection space to data in the second profile connection space;
   wherein the transmission scanner included in step (c) includes a transmission scanner profile and the method further comprises the step of combining the abstract profile with the transmission scanner profile.

26. A method for incorporating photographic calibration into a digital color management system having an abstract color transformation profile, said method comprising the steps of:
   (a) generating a print from a photographic negative containing an image of a target having a plurality of colored and neutral patches;
   (b) scanning said negative in a transmission scanner and generating negative image data;
   (c) transforming the negative image data to data in a first profile connection space using the color management system;
   (d) scanning said print in a reflection scanner and generating reproduction image data;
   (e) transforming the reproduction image data to data in a second profile connection space using the color management system; and
   (f) computing an abstract profile to transform said data in the first profile connection space to data in the second profile connection space;

wherein the transmission scanner included in step (b) includes a transmission scanner profile and the method further comprises the step of combining the abstract profile with the transmission scanner profile.

27. A digital color management method incorporating photographic calibration for reproducing an image from a photographic film, said method comprising the steps of:

scanning said photographic film in a transmission scanner and generating photographic film image data;

transforming the photographic film image data by means of a transmission scanner profile to data in a first profile connection space;

transforming the data in the first profile connection space by means of an abstract profile to data in a second profile connection space; and processing the data in the second profile connection space through a destination profile in order to form a reproduction of the image, wherein the abstract profile is computed in a calibration process by:

(a) generating an optical reproduction from a photographic target film containing an image of a target having a plurality of colored and neutral patches;

(b) scanning said target film in the transmission scanner and generating target film image data;

(c) transforming the target film image data to target data in the first profile connection space using the color management system;

(d) reading said optical reproduction and generating reproduction target image data;

(e) transforming the reproduction target image data to target data in the second profile connection space using the color management system; and (f) computing the abstract profile to transform said target data in the first profile connection space to target data in the second profile connection space;

wherein the abstract profile is combined with the transmission scanner profile to form a single source profile for transforming the photographic film data into data in a single profile connection space, and the data in the single profile connection space is then processed through the destination profile.

28. A method for incorporating photographic calibration into a digital color management system having an abstract color transformation profile, said method comprising the steps of:

(a) generating optical reproduction data from a photographic negative containing an image of a target having a plurality of colored and neutral patches;

(b) scanning said negative in a transmission scanner and generating negative image data;

(c) transforming the negative image data to data in a first profile connection space using the color management system;

(d) transforming the optical reproduction data to data in a second profile connection space using the color management system; and (e) computing an abstract profile to transform said data in the first profile connection space to data in the second profile connection space;

wherein the step (e) of computing an abstract profile includes the correction of tone scale and other color differences before computing the abstract profile.

29. A method for incorporating photographic calibration into a digital color management system having an abstract color transformation profile, said method comprising the steps of:

(a) capturing an image of a target having a plurality of colored and neutral patches on both a photographic negative and a photographic transparency;

(b) generating an optical reproduction from the photographic negative;

(c) scanning said photographic transparency in a transmission scanner and generating transparency image data;

(d) transforming the transparency image data to data in a first profile connection space using the color management system;

(e) reading said optical reproduction and generating reproduction image data;

(f) transforming the reproduction image data to data in a second profile connection space using the color management system; and (g) computing an abstract profile to transform said data in the first profile connection space to data in the second profile connection space;

wherein the step (g) of computing an abstract profile includes the correction of tone scale and other color differences before computing the abstract profile.

30. A method for incorporating photographic calibration into a digital color management system having an abstract color transformation profile, said method comprising the steps of:

(a) generating a print from a photographic negative containing an image of a target having a plurality of colored and neutral patches;

(b) scanning said negative in a transmission scanner and generating negative image data;

(c) transforming the negative image data to data in a first profile connection space using the color management system;

(d) scanning said print in a reflection scanner and generating reproduction image data;

(e) transforming the reproduction image data to data in a second profile connection space using the color management system; and (f) computing an abstract profile to transform said data in the first profile connection space to data in the second profile connection space;

wherein the step (f) of computing an abstract profile includes the correction of tone scale and other color differences before computing the abstract profile.

31. A method for incorporating photographic calibration into a digital color management system having an abstract color transformation profile, said system comprising:

generating an optical reproduction from a photographic film containing an image of a target having a plurality of colored and neutral patches;

scanning said photographic film and generating film image data;

reading said optical reproduction and generating reproduction image data;

transforming the film image data to data in a first profile connection space and transforming the reproduction image data to data in a second profile connection space; and computing an abstract profile to transform said data in the first profile connection space to data in the second profile connection space;

wherein the generating of an optical reproduction from the film and subsequently reading of the optical reproduction further comprises computing print densities from transmission densities of the target patches from the photographic film, whereby the print densities become the reproduction image data that is transformed into the second profile connection space.

32. A system for incorporating photographic calibration into a digital color management system having an abstract color transformation profile, said system comprising:
   means for generating an optical reproduction from a photographic film containing an image of a target having a plurality of colored and neutral patches;
   a transmission scanner for scanning said photographic film and generating film image data;
   means for reading said optical reproduction and generating reproduction image data;
   a processor using the color management system for transforming the film image data to data in a first profile connection space and for transforming the reproduction image data to data in a second profile connection space; and
   an algorithm for computing an abstract profile to transform said data in the first profile connection space to data in the second profile connection space;
   wherein the means for generating an optical reproduction from the film and subsequently reading the optical reproduction comprises means for computing print densities from transmission densities of the target patches from the photographic film, whereby the print densities become the reproduction image data that is transformed into the second profile connection space.

33. The system as claimed in claim 32 wherein the photographic film is a negative and the optical reproduction is an optical print.

34. The system as claimed in claim 33 wherein the means for reading said optical reproduction comprises a reflection scanner for scanning said optical print.

35. The system as claimed in claim 32 wherein the optical reproduction is a photographic transparency.

36. The system as claimed in claim 23 wherein the means for reading said optical reproduction comprises a transmission scanner for scanning said photographic transparency.

37. The system as claimed in claim 32 wherein the means for reading said optical reproduction comprises a spectrophotometer for measuring the colors of the target patches on the optical reproduction.

38. The system as claimed in claim 32 wherein the means for reading said optical reproduction comprises a colorimeter for measuring the colors of the target patches on the optical reproduction.

39. The system as claimed in claim 32 wherein the algorithm for computation of an abstract profile includes a polynomial model technique.

40. The system as claimed in claim 32 further comprising a store for storing the abstract profile.

41. A system for incorporating photographic calibration into a digital color management system having an abstract color transformation profile, said system comprising:
   means for generating an optical reproduction from a photographic film containing an image of a target having a plurality of colored and neutral patches;
   a transmission scanner for scanning said photographic film and generating photographic film image data;
   means for reading said optical reproduction and generating reproduction image data;
   a processor using the color management system for transforming the photographic film image data to data in a first profile connection space and for transforming the reproduction image data to data in a second profile connection space; and
   an algorithm for computing an abstract profile to transform said data in the first profile connection space to data in the second profile connection space;
   wherein the processor uses a transmission scanner profile for transforming the photographic film image data to data in a first profile connection space, and wherein the abstract profile is combined with the transmission scanner profile.

42. A computer program product for incorporating photographic calibration into a digital color management system having an abstract color transformation profile, said computer program product comprising: a computer readable storage medium having a computer program stored thereon for performing the steps of:
   (a) generating an optical reproduction from a photographic film containing an image of a target having a plurality of colored and neutral patches;
   (b) scanning said photographic film in a transmission scanner and generating film image data;
   (c) transforming the film image data to data in a first profile connection space using the color management system;
   (d) reading said optical reproduction and generating reproduction image data;
   (e) transforming the reproduction image data to data in a second profile connection space using the color management system; and
   (f) computing an abstract profile to transform said data in the first profile connection space to data in the second profile connection space;
   wherein the transmission scanner included in step (b) includes a transmission scanner profile and the method further comprises the step of combining the abstract profile with the transmission scanner profile.

43. The computer program product as claimed in claim 42 wherein the computation of an abstract profile in step (f) is accomplished using a polynomial model technique.

44. The computer program product as claimed in claim 42 further comprising the step of storing the abstract profile.

45. A computer program product for incorporating photographic calibration into a digital color management system having an abstract color transformation profile, said computer program product comprising: a computer readable storage medium having a computer program stored thereon for performing the steps of:
   (a) generating an optical reproduction from a photographic film containing an image of a target having a plurality of colored and neutral patches;
   (b) scanning said photographic film in a transmission scanner and generating film image data;
   (c) transforming the film image data to data in a first profile connection space using the color management system;
   (d) reading said optical reproduction and generating reproduction image data;
   (e) transforming the reproduction image data to data in a second profile connection space using the color management system; and
   (f) computing an abstract profile to transform said data in the first profile connection space to data in the second profile connection space;

wherein generating an optical reproduction in step (a) comprises computing print densities from transmission densities of the target patches from the photographic film.

46. A computer program product for incorporating photographic calibration into a digital color management system having an abstract color transformation profile, said computer program product comprising:

a computer readable storage medium having a computer program stored thereon for performing the steps of:
 (a) generating an optical reproduction from a photographic film containing an image of a target having a plurality of colored and neutral patches;
 (b) scanning said photographic film in a transmission scanner and generating film image data;
 (c) transforming the film image data to data in a first profile connection space using the color management system;
 (d) reading said optical reproduction and generating reproduction image data;
 (e) transforming the reproduction image data to data in a second profile connection space using the color management system; and
 (f) computing an abstract profile to transform said data in the first profile connection space to data in the second profile connection space;

wherein the step (f) of computing an abstract profile includes the correction of tone scale and other color differences before computing the abstract profile.

47. A computer program product for incorporating photographic calibration, said computer program product comprising: a computer readable storage medium having a computer program stored thereon for performing the steps of:

scanning a photographic film in a transmission scanner and generating film image data;

transforming the film image data by means of a transmission scanner profile to data in a first profile connection space;

transforming the data in the first profile connection space by means of an abstract profile to data in a second profile connection space; and processing the data in the second profile connection space through a destination profile in order to form a reproduction of the image, wherein the abstract profile is computed in a calibration process by:
 (a) generating an optical reproduction from a photographic target film containing an image of a target having a plurality of colored and neutral patches;
 (b) scanning said target film in the transmission scanner and generating target film image data;
 (c) transforming the target film image data to target data in the first profile connection space using the color management system;
 (d) reading said optical reproduction and generating reproduction target image data;
 (e) transforming the reproduction target image data to target data in the second profile connection space using the color management system; and
 (f) computing the abstract profile to transform said target data in the first profile connection space to target data in the second profile connection space;

wherein the abstract profile is combined with the transmission scanner profile to form a single source profile for transforming the film data into data in a single profile connection space, and the data in the single profile connection space is then processed through the destination profile.

* * * * *